United States Patent [19]

Nowlin et al.

[11] Patent Number: 5,025,072

[45] Date of Patent: Jun. 18, 1991

[54] HIGHLY ACTIVE CATALYST COMPOSITION FOR POLYMERIZING ALPHA-OLEFINS

[75] Inventors: Thomas E. Nowlin, Kendall Park; Klaus P. Wagner, East Windsor, both of N.J.

[73] Assignee: Mobil Oil Corporation, Fairfax, Va.

[21] Appl. No.: 800,841

[22] Filed: Nov. 22, 1985

Related U.S. Application Data

[60] Division of Ser. No. 633,991, Jul. 24, 1984, Pat. No. 4,605,638, which is a division of Ser. No. 444,152, Nov. 24, 1982, Pat. No. 4,481,301, which is a continuation-in-part of Ser. No. 327,534, Dec. 4, 1981, abandoned.

[51] Int. Cl.$^5$ .................... C08F 4/608; C08F 4/648; C08F 210/02

[52] U.S. Cl. .................... 526/129; 526/142; 526/151; 526/156; 526/348.5; 526/348.6; 526/901

[58] Field of Search ............... 526/129, 142, 151, 156

[56] References Cited

U.S. PATENT DOCUMENTS

| | | | |
|---|---|---|---|
| 3,907,759 | 9/1975 | Okada et al. | 526/128 |
| 4,011,382 | 3/1977 | Levine et al. | 526/98 |
| 4,076,698 | 2/1978 | Anderson et al. | 526/348.6 |
| 4,148,754 | 4/1979 | Strobel et al. | 526/129 |
| 4,243,619 | 1/1981 | Fraser et al. | 526/348.6 |
| 4,298,713 | 11/1981 | Morita et al. | 526/348.6 |
| 4,311,752 | 1/1982 | Dietrich et al. | 526/348.6 |
| 4,363,904 | 12/1982 | Fraser et al. | 526/348.6 |
| 4,390,677 | 6/1983 | Karol et al. | 526/348.6 |
| 4,424,330 | 1/1984 | Raviola | 526/348.6 |
| 4,565,795 | 1/1986 | Short et al. | 526/129 |

FOREIGN PATENT DOCUMENTS 2543219 4/1977 Fed. Rep. of Germany ...... 526/124

*Primary Examiner*—Edward J. Smith
*Attorney, Agent, or Firm*—Alexander J. McKillop; Charles J. Speciale; Marina V. Schneller

[57] ABSTRACT

There is disclosed a highly active catalyst composition for polymerizing alpha-olefins prepared by treating a support with an organomagnesium composition and contracting the thus formed solid support, containing magnesium, in a liquid medium with a transition metal compound, e.g., a tetravalent titanium compound. This catalyst is particularly useful for the production of linear low density polyethylene polymers. Also disclosed are methods of preparing polymers with the catalyst composition and the resulting polymers.

27 Claims, 5 Drawing Sheets

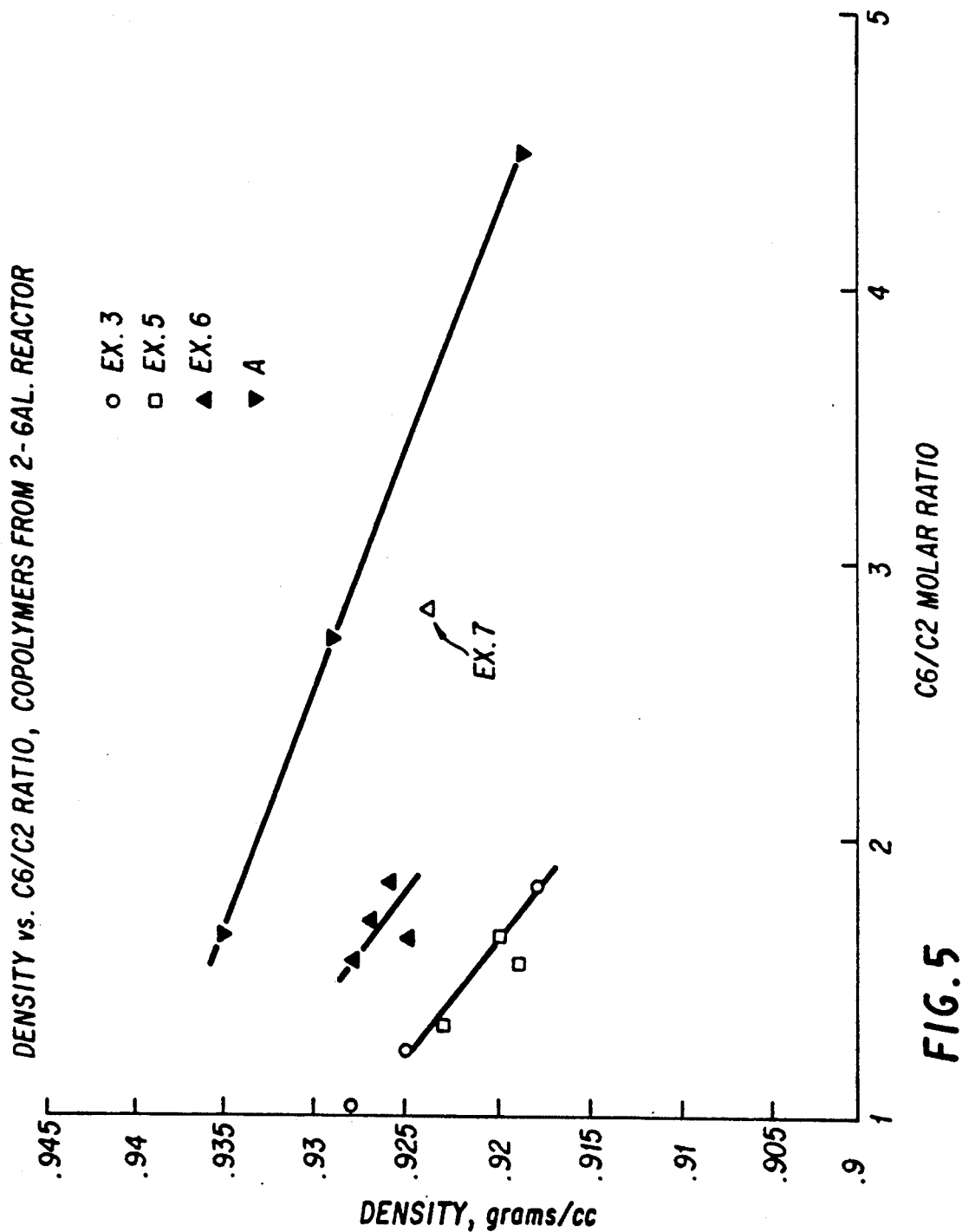

HIGHLY ACTIVE CATALYST COMPOSITION FOR POLYMERIZING ALPHA-OLEFINS

CROSS REFERENCE TO RELATED APPLICATIONS

This is a divisional of copending application Ser. No. 633,991, filed on July 24, 1984, now U.S. Pat. No. 4,605,638, which was a divisional of Application Ser. No. 444,152, filed on Nov. 24, 1982, now U.S. Pat. No. 4,481,301, which was a continuation-in-part of Application Ser. No. 327,534, filed on Dec. 4, 1981, now abandoned. The contents of all of the above-identified prior applications are incorporated herein by reference.

BACKGROUND

The present invention relates to a method for polymerizing alpha-olefins, a catalyst for such a polymerization and a method for producing such a catalyst. A particular aspect of the present invention relates to a method for producing linear low density polyethylene.

Linear low density polyethylene polymers possess properties which distinguish them from other polyethylene polymers such as homopolymers of polyethylene. Certain of these properties are described in the Anderson et al U.S. Pat. No. 4,076,698.

The Karol et al U.S. Pat. No. 4,302,566 describes a process for producing certain linear low density polyethylene polymers in a gas phase, fluid bed reactor.

The Graff U.S. Pat. No. 4,173,547, Stevens et al U.S. Pat. No. 3,787,384, Strobel et al U.S. Pat. No. 4,148,754 and the Ziegler, deceased et al U.S. Pat. No. 4,063,009 each describe various polymerization processes suitable for producing forms of polyethylene other than linear low density polyethylene, per se.

The Graff U.S. Pat. No. 4,173,547 describes a supported catalyst obtained by treating a support with both an organoaluminum compound and an organomagnesium compound followed by contacting this treated support with a tetravalent titanium compound.

The Stevens et al U.S. Pat. No. 3,787,384 and the Strobel et al U.S. Pat. No. 4,148,754 describe a catalyst prepared by first reacting a support (e.g., silica containing reactive hydroxy groups) with an organomagnesium compound (e.g., a Grignard reagent) and then combining this reacted support with a tetravalent titanium compound. According to the teachings of both of these patents, no unreacted organomagnesium compound would seem to be present when the reacted support is contacted with the tetravalent titanium compound.

The Ziegler, deceased et al U.S. Pat. No. 4,063,009 describes a catalyst which is the reaction product of an organomagnesium compound (e.g., an alkylmagnesium halide) with a tetravalent titanium compound. This reaction with the tetravalent titanium compound takes place in the absence of a support material.

SUMMARY

The present invention relates to a process for preparing a supported catalyst composition for use in alpha-olefin polymerization reactions, said process comprising the steps of:

(i) contacting a solid, porous carrier having reactive OH groups with a liquid in the absence of ball milling, said liquid containing at least one organomagnesium composition having the empirical formula $$R_n MgR'_{(2-n)} \qquad (I)$$

where R and R' are the same or different and represent $C_1$–$C_{12}$ hydrocarbyl groups, provided that R' may also be halogen, and n is a rational number from about 0.5 to 2, whereby organomagnesium is reacted with OH groups on said carrier;

(ii) evaporating said liquid from step (i) to precipitate magnesium onto said carrier, said precipitated magnesium being selected from the group consisting of magnesium dihalide, unreacted organomagnesium and mixtures thereof, whereby a supported magnesium composition in the form of a dry, free-flowing powder is formed; and (iii) reacting said powder of step (ii) with at least one tetravalent titanium compound in a liquid medium, the number of moles of said tetravalent titanium compound being in excess of the number of OH groups on said carrier prior to reaction with said organomagnesium in step (i), said tetravalent titanium compound being soluble in said liquid medium, and said supported magnesium composition, including the supported material thereof, being essentially insoluble in said liquid medium, whereby a reacted form of titanium which is insoluble in said liquid medium becomes supported on said carrier.

The present invention also relates to a process for preparing a supported catalyst composition for use in alpha-olefin polymerization reactions, said process comprising the steps of:

(i) contacting silica having from about 0.3 to about 0.7 moles/g of OH groups with a liquid in the absence of ball milling, said liquid containing at least one organomagnesium composition having the empirical formula $$RMgR' \qquad (II)$$

where R represents $C_1$–$C_{12}$ hydrocarbyl group and R' represents halogen, at least a portion of said organomagnesium composition being soluble in said liquid medium, the ratio of the number of moles of said organomagnesium composition to the number of moles of OH groups on said silica being from about 1.1 to about 2.5, whereby organomagnesium is reacted with OH groups on said silica, (ii) evaporating said liquid from step (i) to precipitate magnesium onto said carrier, said precipitated magnesium being selected from the group consisting of magnesium dihalide, unreacted organomagnesium and mixtures thereof, whereby a supported magnesium composition in the form of a dry, free-flowing powder is formed; and (iii) reacting said powder of step (ii) with at least one tetravalent titanium compound in a liquid medium, the number of moles of said tetravalent titanium compound being in excess of the number of moles of magnesium supported on said silica, said tetravalent titanium compound being soluble in said liquid medium, and said supported magnesium composition, including the supported material thereof, being essentially insoluble in said liquid medium, whereby a reacted form of titanium which is insoluble in said liquid medium becomes supported on said silica.

The present invention further relates to a process for preparing a linear low density polyethylene polymer having a density of 0.94 g/cc or less, said process comprising conducting the polymerization in the presence of a catalyst prepared by a process comprising the steps of:

(i) contacting a solid, porous carrier having reactive OH groups with a liquid in the absence of ball milling, said liquid containing at least one organomagnesium composition having the empirical formula $$R_nMgR'_{(2-n)} \quad (I)$$

where R and R' are the same or different and represent $C_1$-$C_{12}$ hydrocarbyl groups, provided that R' may also be halogen, and n is a rational number from about 0.5 to 2, whereby organomagnesium is reacted with OH groups on said carrier;

(ii) evaporating said liquid from step (i) to precipitate magnesium onto said carrier, said precipitated magnesium being selected from the group consisting of magnesium dihalide, unreacted organomagnesium and mixtures thereof, whereby a supported magnesium composition in the form of a dry, free-flowing powder is formed; and (iii) reacting said powder of step (ii) with at least one tetravalent titanium compound in a liquid medium, the number of moles of said tetravalent titanium compound being in excess of the number of OH groups on said carrier prior to reaction with said organomagnesium in step (i), said tetravalent titanium compound being soluble in said liquid medium, and said supported magnesium composition, including the supported material thereof, being essentially insoluble in said liquid medium, whereby a reacted form of titanium which is insoluble in said liquid medium becomes supported on said carrier.

The present invention further relates to a process for preparing a linear low density polyethylene polymer which is an ethylene/1-hexene copolymer having a density of 0.93 g/cc or less, said process comprising conducting the polymerization in a gas phase, fluid bed reactor in the presence of a catalyst produced by a process comprising the steps of:

(i) contacting silica having from about 0.3 to about 0.7 moles/g of OH groups with a liquid in the absence of ball milling, said liquid containing at least one organomagnesium composition having the empirical formula $$RMgR' \quad (II)$$

where R represents $C_1$-$C_{12}$ hydrocarbyl group and R' represents halogen, at least a portion of said organomagnesium composition being soluble in said liquid medium, the ratio of the number of moles of said organomagnesium composition to the number of moles of OH groups on said silica being from about 1.1 to about 2.5, whereby organomagnesium is reacted with OH groups on said silica, (ii) evaporating said liquid from step (i) to precipitate magnesium onto said carrier, said precipitated magnesium being selected from the group consisting of magnesium dihalide, unreacted organomagnesium and mixtures thereof, whereby a supported magnesium composition in the form of a dry, free-flowing powder is formed; and (iii) reacting said powder of step (ii) with at least one tetravalent titanium compound in a liquid medium, the number of moles of said tetravalent titanium compound being in excess of the number of moles of magnesium supported on said silica, said tetravalent titanium compound being soluble in said liquid medium, and said supported magnesium composition, including the supported material thereof, being essentially insoluble in said liquid medium, whereby a reacted form of titanium which is insoluble in said liquid medium becomes supported on said silica.

BRIEF DESCRIPTION OF THE DRAWINGS

FIGS. 4 and 5 are graphs showing the variation in density of LLDPE polymers with the ratio of hexene to ethylene in the feed using a prior art catalyst and catalysts according to the invention.

DETAILED DESCRIPTION

Figure 1:
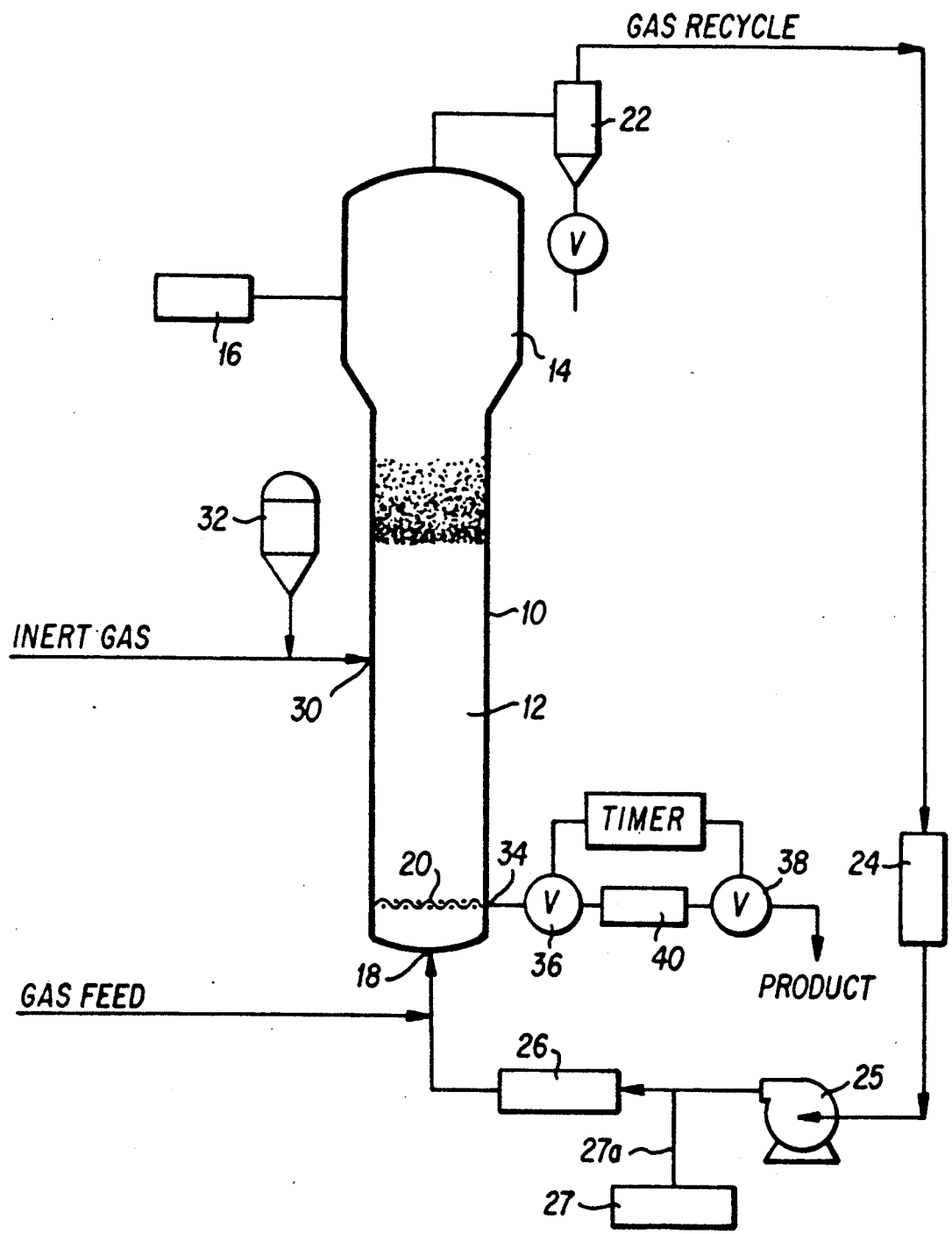
FIG. 1 is a diagrammatic illustration of a fluid bed process for producing linear low density polyethylene (LLDPE).

In accordance with an aspect of the present invention, supported titanium is incorporated onto a suitable support by impregnating this support with reactive magnesium and utilizing this supported reactive magnesium to react with tetravalent titanium (i.e., titanium in the plus 4 valence state) in a liquid medium. Unreacted titanium is soluble in this liquid medium, while reacted titanium and supported reactive magnesium are insoluble in this liquid medium.

As used herein, the concept of supporting a material on a carrier is intended to connote the incorporation of material (e.g., magnesium compositions and/or titanium compositions) onto the carrier by physical or chemical means. Accordingly, supported material need not necessarily be chemically bound to the carrier.

Catalysts produced according to aspects of the present invention may be described in terms of the manner in which they can be made. More particularly, these catalysts can be described in terms of the manner in which a suitable carrier may be treated in order to form such catalysts.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 200 microns, more preferably from about 10 to about 80 microns. Preferably, the carrier is in the form of spherical particles, e.g., spray dried silica. The internal porosity of these carriers may be larger than 0.2 $cm^3$/gm, e.g., larger than about 0.6 $cm^3$/g. The specific surface area of these carriers may be larger than about 50 $m^2$/g, e.g., from about 150 to about 1500 $m^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 800° C., e.g., from about 150° C. to about 250° C.

Chemically bound water, as represented by a presence of OH groups in the carrier, may be present when the carrier is contacted with water-reactive magnesium compounds in accordance with an aspect of the present invention. This chemically bound water may be present as about 0.3 mmoles or more of OH groups per gram of carrier. Accordingly, an amount of, e.g., from about 0.5 to about 5 mmoles of OH groups per gram of carrier may be present, but a preferred range is from about 0.3 to about 0.7 mmoles of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at at least 500 or 600° C., most especially, about from about 750° C. to about 850° C. The duration of heating may be overnight, e.g., 16 hours or a shorter period, e.g., at least 4 hours. The surface hydroxyl concentration of silica may be determined according to J. B. Peri and A. L. Hensley, Jr., *J. Phys. Chem.*, 72 (8), 2926 (1968).

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in *Journal of the American Chemical Society*, 60, pp. 209–319 (1938). Specific surface areas of carriers can also be measured in accordance with the above-mentioned BET-technique, with use of the standardized method as described in *British Standards* BS 4359, Volume 1, (1969).

Further examples of carrier materials are given in the Stevens et al., U.S. Pat. No. 3,718,636. Note particularly the passage extending from line 12 to line 29 of column 3 of this Stevens et al patent. Also included as examples of carrier materials are polymeric silicas known as polysiloxanes.

An example of a preferred carrier is silica which has been dehydrated by fluidizing with nitrogen and heating at about 800° C. for about 16 hours to achieve a surface hydroxyl concentration of about 0.5 mmols/g. The silica used may be a nigh surface area, amorphous silica (surface area = 300 m$^2$/g; pore volume of 1.65 cm$^3$ per gram) marketed under the tradename Davison 952 by the Davison Division of W. R. Grace and Co.

A suitable dehydrated carrier material may be further treated by impregnating same with a solid magnesium containing composition which is capable of reacting with a tetravalent titanium compound. One such magnesium containing material is an organomagnesium composition of the formula $R_nMgR'_{(2-n)}$, where R and R' are the same or different and represent stable organic moieties, provided that R' may also be halogen, and n is a rational number from about 0.5 to 2. A particular example of a solution of such an organomagnesium composition is a Grignard reagent.

Grignard reagents are described in *Organic Chemistry*, Second Edition, Morrison and Boyd, fifth printing, May 1968, pp. 112–114 and 516–521. Grignard reagents are known to react with organic molecules or moieties which have hydrogen bonded directly to a nitrogen or oxygen atom. Furthermore, Grignard reagents are also known to react with organic molecules or moieties containing carbonyl groups, cyano groups and nitro groups. Accordingly, stable organic moieties as defined by R in the above-mentioned formula generally would not have any of the above-mentioned groups indicated as being reactive with Grignard reagents. Thus, examples of R and R' include $C_1$–$C_{12}$ hydrocarbyl groups (e.g., $C_1$–$C_{12}$ alkyl or $C_6$–$C_{12}$ aryl) or $C_1$–$C_{12}$ alkoxy groups, which may be unsubstituted or substituted, e.g., with one or more of halogen (e.g., F, Cl, Br or I), $C_1$–$C_{12}$ alkoxy, etc. A preferred composition according to the formula $R_nMgR'_{(2-n)}$ is ethylmagnesium chloride.

It is noted that even a Grignard reagent of ethylmagnesium chloride may contain a mixture of molecules other than ethylmagnesium chloride, per se. For example, particularly under the influence of various liquids or solvent systems, ethylmagnesium chloride may disproportionate to form essentially a mixture of magnesium dichloride and diethylmagnesium. Such mixtures are intended to be encompassed within the formula $R_nMgR'_{(2-n)}$. Accordingly, it will be understood that compositions of the formula $R_nMgR'_{(2-n)}$ and compositions representative thereof are intended herein to represent the overall empirical formula of these compositions rather than to set forth the molecular formula of these compositions.

Preferably, the carrier should be impregnated such that the pores of same contain reactive solid magnesium containing composition. A preferred means of accomplishing this result is by incorporating a porous carrier in a liquid medium containing a dissolved organomagnesium composition of the formula $R_nMgR'_{(2-n)}$ and to cause magnesium to become impregnated into the pores of the carrier by (1) a reaction of the organomagnesium composition with the carrier, by (2) a precipitation of magnesium from the organomagnesium composition onto the carrier or by (3) a combination of such reaction and precipitation.

Organo-magnesium compositions corresponding to those found in Grignard reagents have the formula RMgX, where R is as defined hereinabove and X is halogen, (e.g., Cl, Br or I), and are soluble in ethers. Examples of such ethers are mentioned on column 4, lines 32–49 of the Yamaguchi et al. U.S. Pat. No. 3,989,881 and include aliphatic ethers, such as diethyl ether, diisopropyl ether, dibutyl ether, dipentyl ether and ethyl-n-butyl ether; and cyclic ethers such as tetrahydrofuran and dioxane. It has been theorized that the reason for the ability of such ethers (e.g., diethyl ether) to solubilize such organomagnesium compositions (e.g. $C_2H_5MgCl$) is by virtue of the ability of the magnesium atom to act as a Lewis acid and to associate with at least one electron pair from the etheric oxygen which acts as a Lewis base. Such an association is represented as follows:

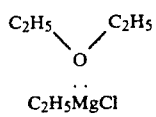

C₂H₅MgCl

Although organomagnesium compounds of the formula RMgX tend to be insoluble in non-Lewis base solvents such as hexane, these organomagnesium compounds may be completely soluble in mixed solvent systems such as hexane/tetrahydrofuran, provided that a sufficient solubilizing amount of the Lewis base solvent is present. Thus, according to one aspect of the present invention, a carrier may be slurried in a non-Lewis base co-solvent and an organomagnesium compound may be added thereto in the form of an ether solution thereof. Examples of non-Lewis base co-solvents are given in the passage extending from column 6, line 61 to column 7, line 8 of the Graff U.S. Pat. No. 4,173,547. These co-solvents include straight or branched saturated aliphatic hydrocarbons, such as butanes, pentanes, hexanes, heptanes, or commonly available mixtures thereof, generally known as gasoline, kerosene, gas, oil or other petroleum fractions. Further, such co-solvents include cyclic hydrocarbons, such as cyclopentane, cyclohexane, methylcyclohexane, as well as aromatic hydrocarbons, such as benzene or halogen-aromatic hydrocarbons such as chlorobenzene. It is noted that such co-solvents should preferably not contain groups which are reactive with the organomagnesium composition. A preferred co-solvent is n-hexane.

According to another aspect of the present invention, carrier is impregnated with magnesium composition by suitably contacting this carrier with a liquid containing organomagnesium composition of the formula $R_nMgR'_{(2-n)}$ in a partially dissolved state. More particularly, the carrier may be slurried in one of the above-exemplified non-Lewis base co-solvents, such as hexane, and a solution of Grignard in ether may be added thereto, the amount of ether relative to the amount of co-solvent being sufficient to only partially solubilize the Grignard. The non-soluble portion of the Grignard may be in the form of dihalomagnesium, the amount of this non-soluble dihalomagnesium being essentially equivalent to an amount of dialkylmagnesium remaining soluble in the solvent/co-solvent mixture.

It is noted that if the organomagnesium compound is only sparingly soluble, e.g., to the extent of even 1 percent or less, reactive organomagnesium which is consumed by reactive sites on the carrier will be replaced by further dissolution of undissolved organomagnesium by a mass action effect.

Another example of a means of impregnating is to slurry the carrier in a Lewis base solvent such as an ether and to add a solution of organomagnesium in ether to this slurry, the addition of organomagnesium/ether solution to ether or co-solvent/carrier slurry may take place as a gradual continuous dropwise addition while the liquid medium of the slurry is maintained under reflux conditions. Upon such addition, dissolved organomagnesium composition may react with the carrier at the site of reactive OH groups, if any, appearing on the available surface area of the carrier. Such a reaction may be demonstrated with respect to ethylmagnesium chloride as follows:

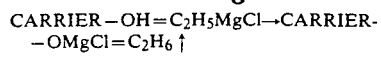

Accordingly, it may be possible to incorporate a magnesium composition onto a carrier by reacting an organomagnesium composition with reactive OH groups of the carrier.

Another means of incorporating a magnesium composition onto a carrier is to precipitate magnesium from an organomagnesium composition from a liquid onto a carrier. This precipitation may take place by any possible convenient means including cooling of the solvent, using a sufficiently large amount of non-solvent in the initial slurry, adding non-solvent to the slurry or stripping off solvent. In the case of a carrier slurry where the liquid medium is essentially a hexane/tetrahydrofuran solution of ethylmagnesium chloride, it is preferred to precipitate ethylmagnesium chloride onto the carrier by distillation of the solvent. In this regard, it is noted that tetrahydrofuran and hexane have nearly equivalent boiling points. Thus, it would be expected that during the course of distilling these solvents, the ratio of tetrahydrofuran to hexane in the liquid state would remain essentially constant. On the other hand, if the boiling point of the co-solvent is significantly greater than the boiling point of the ether, then the relative concentration of co-solvent may increase appreciably as the distillation proceeds. In such a case, a non-uniform precipitation of magnesium may occur, such that any magnesium dihalide which is present tends to precipitate before organomagnesium is precipitated.

Particularly in view of the above discussion, it will be understood that at least three possible types of supported magnesium compositions can be obtained. The first type is essentially a reaction product of an organomagnesium composition with a carrier having OH functionalities which are reactive with this organomagnesium composition. This product would contain essentially no precipitated organomagnesium composition. Examples of such reaction products are given in the aforementioned Stevens et al U.S. Pat. No. 3,787,384 and Strobel et al U.S. Pat. No. 4,148,754.

A second type of product is essentially an organomagnesium composition supported on a carrier. This product would contain essentially no reaction product of organomagnesium with the carrier. Such a product could result when an organomagnesium composition is precipitated onto a carrier having essentially no OH functionalities reactive with the organomagnesium composition.

A third type of product contains both reacted organomagnesium composition and precipitated organomagnesium composition. Such a product could result when an excess of organomagnesium is precipitated in the presence of a carrier containing reactive OH functionalities.

Accordingly, magnesium may be incorporated onto a carrier in either an unreacted form or in a reacted form, this reaction taking place between reactive hydroxyl groups of the carrier and an organomagnesium composition. The molar ratio of organomagnesium composition used to impregnate the carrier with respect to the hydroxyl groups of the carrier may be, e.g., from about 0.5 to about 3. When an excess of organomagnesium is used, this ratio may be, e.g., from about 1.1 to about 2.5.

Whether magnesium is in the form of a reaction product with the carrier or in the form of a non-reacted precipitate, it is noted that this supported magnesium may, optionally, be in the form of a complex with one or more electron donating agents (i.e. Lewis bases). More particularly, when ethylmagnesium chloride is precipitated from a hexane/tetrahydrofuran solution, each mole of etnylmagnesium chloride precipitated may be complexed with approximately one mole of tetrahydrofuran. In more general terms, when an organomagnesium composition is precipitated from a solution containing an ether, the resulting precipitate may have molecules of this ether complexed with molecules of the organomagnesium composition.

The amount of magnesium composition which is impregnated onto the carrier should be sufficient to react with tetravalent titanium in order to incorporate a catalytically effective amount of titanium on the carrier in the manner set forth hereinbelow. More particularly, for example, from about 0.1 to about 5 or even 50 mmoles of magnesium may be impregnated per gram of carrier initially present. When a liquid containing an organomagnesium composition is contacted with a Carrier the amount of magnesium in this liquid in terms of mmoles may be essentially the same as that stated above with respect to that which is impregnated onto the carrier.

When a non-Lewis base co-solvent is used to slurry the carrier, an amount of such co-solvent sufficient to slurry such carrier may be used. More particularly, for example, from about 2 to about 100 mls of such co-solvent may be present per gram of carrier. A preferred narrower range would be from about 5 to about 15 mls of co-solvent per gram of carrier.

The amount and concentration of organomagnesium/ether solution which is added to the co-solvent/carrier slurry are preferably sufficient to assure that the organomagnesium composition is at least partially soluble in the co-solvent/solvent system. Thus, this amount is dependent upon many factors such as the composition of solvents and organomagnesium, the temperature of the co-solvent/solvent system, etc. However, it will be readily understood that the selection of proper amounts and concentrations of organomagnesium/ether solutions is well within the ability of those of ordinary skill in the art. More particularly, for example, when an ethylmagnesium chloride/tetrahydrofuran solution is added to a hexane/carrier slurry, the concentration of the ethylmagnesium chloride/tetrahydrofuran solution may be from about 0.1 to about 10 Molar. A preferred narrower range would be from about 1 to about 3 Molar.

For example, when 107 g of silicic acid are suspended in 500 ml of n-heptane and 342 ml of a solution of 172 mmols of n-propyl magnesium chloride in diethyl ether are added thereto in accordance with Example 1 of the Strobel et al U.S. Pat. No. 4,148,754, the n-propyl magnesium chloride may well be totally soluble in the n-heptane/diethyl ether mixture. However, when 15 g of silica are slurried in 200 ml of n-hexane and 50 ml of a 2.0 molar solution of ethylmagnesium chloride in tetrahydrofura is added thereto in accordance with Example 1 given herein, infra, the ethylmagnesium chloride appears to be only partially soluble in the n-hexane/tetrahydrofuran mixture.

While the above-exemplified methods of incorporating a solid reactive magnesium composition onto a carrier are preferred, it will be understood that alternative methods are available. For instance, it is possible to precipitate a dialkylmagnesium composition onto a carrier from a hydrocarbyl or halohydrocarbyl solvent containing essentially no ether. It is also possible to combine carrier and a solid organomagnesium composition in the absence of a solvent by means of a ball milling device. However, such a ball milling process is less preferred, particularly because it does not tend to effectively incorporate a reactive magnesium compound into the pores of the carrier.

It is particularly noted that mechanical shearing means such as ball milling are not necessary to achieve the desired impregnation of catalyst onto carrier in accordance with aspects of the present invention. Accordingly, a ball milling process such as described in Examples 2-5 of the Grant U.S. Pat. No. 3,821,186 is unnecessary and may be avoided. Moreover, a ball milling process may tend to disrupt the particle size and morphology of the carrier. Since catalysts made in accordance with aspects of the present invention are preferably capable of being used in gas phase, fluid bed polymerizations, e.g., as described in the Karol et al U.S. Pat. No. 4,302,566, the particle size and morphology of the catalyst may be rather critical. Accordingly, another reason for avoiding ball milling is to preserve the particle size and morphology of the carrier while it is being treated in accordance with aspects of the present invention.

The solid supported magnesium-containing composition is preferably in the form of a free-flowing powder when dry. It is particularly noted that when a carrier is impregnated by many of the above-exemplified methods neither the carrier nor the magnesium is contacted with either an organoaluminum compound or an aluminum halide compound. Thus, such a treatment with a significant amount of an organoaluminum compound or an aluminum halide compound is preferably not part of the present invention.

A carrier treated with an organomagnesium composition according to the above-exemplified methods may be reacted with a tetravalent titanium compound in a liquid medium. The tetravalent titanium compound is soluble in this liquid reaction medium, while the treated carrier, including the magnesium containing portion thereof, is insoluble in this liquid reaction medium. Thus, the reaction which takes place between the tetravalent titanium and the reactive magnesium-containing composition is a reaction of a solid with a liquid. It is further noted that the reacted titanium is insoluble in the liquid reaction medium.

The reaction which takes place between a solid, supported organomagnesium compound and tetravalent titanium in the liquid reaction medium is felt to be essentially an oxidation/reduction reaction, wherein the organomagnesium composition acts as a reducing agent for the tetravalent titanium. On the other hand, while not wishing to be bound by any particular theory or chemical mechanism, the reaction which takes place between (1) tetravalent titanium and (2) the reaction product of a Grignard reagent and carrier containing reactive OH groups is not felt to be an oxidation/reduction reaction. However, it is noted that both of the above-mentioned reactions lead to the incorporation of titanium onto a support corresponding to the treated carrier.

Examples of tetravalent titanium compounds, which may be used in the liquid reaction medium, are given in the passage extending from line 35 to line 54 of column 6 of the Graff U.S. Pat. No. 4,173,547. Such examples include titanium halides (e.g., where the halide portion thereof is Cl or Br), titanium alkoxides (e.g., where the alkoxide portion thereof is a $C_1$–$C_6$ alkoxide), or mixtures thereof. A preferred tetravalent titanium compound is $TiCl_4$.

It may also be possible to replace some or all of the above-mentioned tetravalent titanium compounds with one or more other transition metal compounds. Such other transition metal compounds are exemplified in the passage extending from line 55 to line 60 of column 6 of the Graff et al U.S. Pat. No. 4,173,547. Preferred transition metal compounds include zirconium compounds (e.g., $ZrCl_4$) and, especially, vanadium compounds (e.g., $VCl_3$).

The liquid portion of the liquid reaction medium is preferably a solution of the tetravalent titanium compound in a solvent which may be one or more of the organic liquids exemplified hereinabove as being suitable for use as a co-solvent in the impregnation of the carrier with reactive magnesium composition. A preferred solvent for the tetravalent titanium compound is n-heptane.

The reaction of the tetravalent titanium compound in the liquid medium conveniently takes place by slurrying the solid carrier containing the reactive magnesium composition in a solution of the tetravalent titanium compound and heating the liquid reaction medium to a suitable reaction temperature, e.g., to the reflux temperature of the solvent at standard atmospheric pressure. Thus, the reaction may take place under reflux conditions.

The various reaction parameters are subject to a wide variety of possibilities, suitable selection of such parameters being well within the skill of those having ordinary skill in the art. However, for example, the volume of tetravalent titanium solution to treated carrier initially slurried in the solution may be from about 0.1 to about 10 mls per gram of such carrier. The concentration of the tetravalent titanium solution may be, for example, from about 0.1 to about 5 Molar. The amount of tetravalent titanium in solution may be, e.g., in excess of the molar amount of organomagnesium earlier used to treat the carrier. More particularly, for example, the molar ratio of tetravalent titanium to organomagnesium may be from about 1 to about 10, more particularly from about 3 to about 6. These ratios given for tetravalent titanium to organomagnesium are generally representative of acceptable ratios for tetravalent titanium to measurable hydroxyl groups on the carrier. Unreacted titanium may be removed by suitable separation techniques such as decantation, filtration and washing.

The supported catalyst may be activated with suitable activators. Such suitable activators include those organometallic compounds described in the passage extending from column 4, line 45 to column 5, line 12 of the Stevens et al U.S. Pat. No. 3,787,384 and in the passage extending from column 4, line 56 to column 5, line 59 of the Strobel et al U.S. Pat. No. 4,148,754. A preferred activator is triethylaluminum.

The catalyst may be activated in situ by adding the activator and catalyst separately to the polymerization medium. It is also possible to combine the catalyst and activator before introduction into the polymerization medium, e.g., for up to about 2 hours at a temperature from about $-40$ to about $80°$ C. Still other types of combinations of catalysts and activators are possible (note the passage extending from line 50 to line 60 in column 5 of the Stevens et al U.S. Pat. No. 3,787,384).

A suitable activating amount of the activator may be used. The number of moles of activator per gram atom of titanium in the catalyst may be, e.g., from about 1 to about 100 and is preferably greater than about 5 (note the passage extending from column 5, line 71 to column 6, line 2 of the Stevens et al U.S. Pat. No. 3,787,384).

Alpha-olefins may be polymerized with the catalysts prepared according to aspects of the present invention by any suitable process. Such processes include polymerizations carried out in suspension, in solution or in the gas phase (note the passage extending from line 25 to line 31 in column 6 of the Strobel et al U.S. Pat. No. 4,148,754 and the passage extending from line 32 to line 49 in column 5 of the Stevens et al U.S. Pat. No. 3,787,384). Gas phase polymerizations are preferred such as those taking place in stirred bed reactors and, especially, fluidized bed reactors.

The molecular weight of the polymer may be controlled in a known manner, preferably by using hydrogen. With the catalysts produced according to aspects of the present invention, molecular weight may be suitably controlled with hydrogen when the polymerization is carried out at relatively low temperatures, e.g., from about 30 to about 105° C. This control of molecular weight may be evidenced by a measurable positive melt index for the polymer produced.

The catalysts prepared according to aspects of the present invention are highly active and may have an activity of at least about 5.8, e.g., from about 5.8 to about 11.6 in terms of grams of polymer produced per hour per mmole of Ti per kPa of ethylene pressure.

The catalysts prepared according to aspects of the present invention are particularly useful for the production of linear low density polyethylene polymers. Such linear low density polyethylene polymers may have a density of 0.94 g/cc or less, preferably 0.930 or less or even 0.925 g/cc or less. In accordance with certain aspects of the present invention, it is possible to achieve densities of less than 0.915 g/cc and even 0.900 g/cc or less.

Advantageous properties of linear low density polyethylene polymers are described in the Anderson et al U.S. Pat. No. 4,076,698. These linear low density polyethylene polymers may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers ethylene/4-xethyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of, e.g., at least 1 percent by weight of the polymer. Accordingly, ethylene/propylene copolymers are possible, but not preferred.

The linear low density polyethylene polymers produced in accordance with certain aspects of the present invention preferably contain at least about 80 percent by weight of ethylene units.

A particularly desirable method for producing linear low density polyethylene polymers, according to an aspect of the present invention, is felt to be via a fluid bed reactor. Such a reactor and means for operating same is described in the Levine et al U.S. Pat. No.

4,011,382 or the Karol et al U.S. Pat. No. 4,302,566. The activity of the catalyst produced in accordance with certain aspects of the present invention is felt to be sufficient to produce a linear low density polyethylene polymer which is an ethylene/1-hexene copolymer, e.g., having a density of less than 0.930 g/cc, in such a fluid bed reactor.

As described in the Karol et al U.S. Pat. No. 4,302,566, a preferred process for conducting a gas phase, fluid bed polymerization is as follows.

The polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated catalyst at a temperature and at a pressure sufficient to initiate the polymerization reaction.

In order to achieve the desired density ranges in the copolymers it is necessary to copolymerize enough of the $\geq C_3$ comonomers with ethylene to achieve a level of >0 to 10 mol percent of the $C_3$ to $C_8$ comonomer in the copolymer. The amount of comonomer needed to achieve this result will depend on the particular comonomer(s) employed.

In accordance with the invention, it has unexpectedly been found that using a gas phase catalytic polymerization reaction, 1-hexene (e.g. normal 1-hexene, and/or 4-methyl-1-pentene) can be incorporated into an ethylene polymer chain with high efficiency. In other words, a relatively small concentration of 1-hexene monomer in the gas phase reactor can lead to a relatively large incorporation of 1-hexene into the polymer. Thus, 1-hexene can be incorporated into an ethylene polymer chain in a gas phase reactor in amounts up to 20 percent by weight, preferably 5 to 11 percent by weight, to produce linear low density polyethylene having a density of less than 0.930 g/cc. The reaction is preferably conducted in a fluid bed reactor using the catalyst according to the invention prepared by impregnating a carrier with both reacted and precipitated magnesium being in excess of the number of moles of OH groups in the carrier, and then reacting this impregnated carrier with a titanium compound in molar excess with respect to supported magnesium. This preferred process is most useful when polymers having a density of 0.920 g/cc are required. However, when higher densities are desired, it is possible to employ catalysts in which the only magnesium present is reacted with the carrier (i.e. in the substantial absence of precipitated magnesium) and/or where the titanium compound is reacted with the supported magnesium composition in a molar ratio of one or less with the magnesium.

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", *Chemical Engineering Progress Symposium Series*, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing in the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 through line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound maybe added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about >0.92 to 0.94, and temperatures of about 90° to 115° C. are used to prepare products having a density of about >0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30 which is above the distribution plate 20. Injecting the catalyst at a point above the distribution plate is an important feature of this invention. Since the catalysts used in the practice of this invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

Certain of the catalysts of the present invention are capable of producing low density ethylene/hexene copolymers in a gas phase, fluid bed reactor, which copolymers are capable of being formed into films having especially desirable properties. More particularly, these catalysts are prepared by heating silica at a temperature of at least 600° C., e.g., from about 750° C. to about 850° C., for a period of time sufficient to remove physically and chemically bound water on the silica to the extent that from about 0.3 to about 0.7 mmoles of OH groups are present per gram of silica. This silica is then slurried in a liquid medium and contacted with from about 1.1 to about 2.5 mmoles of a Grignard reagent in this liquid medium for a time and temperature sufficient to permit dissolved organomagnesium to react with reactive OH groups on the silica. The liquid is then evaporated, and the resulting dry, free-flowing powder is slurried in another liquid medium to be contacted with a tetravalent titanium compound, the number of moles of this tetravalent titanium compound being in excess of the number of moles of magnesium supported on the silica. For example, this molar ratio of tetravalent titanium to supported magnesium may be from about 3 to about 6.

Films having especially desirable properties may be formed with the above-mentioned ethylene/hexene copolymers by a variety of techniques. For example, desirable blown films as well as slot cast films may be formed.

Blown films formed from ethylene/hexene copolymers having a density from 0.920 to 0.927 g/cc may have especially desirable properties for bag structures. For example, such blown films may be fabricated into trash bag structures which, when loaded to capacity, resist breaking when dropped from a height of, e.g., four feet. A particular example of a blown film formed from an ethylene/hexene copolymer having a density of .927 and a melt index of 1 (ASTM D-1238, condition E), which is, in turn, formed in a gas phase, fluid bed reactor with a catalyst according to the present invention, is a blown film having a thickness of 1 mil, a dart impact strength of at least 122 g, an MD Elmendorf tear strength of at least 164 g/mil, a TD Elmendorf tear strength of at least 665 g/mil, a MD tensile strength of at least 6,400 lbs/in$^2$ and a TD tensile strength of at least 5,400 lbs/in$^2$.

Slot cast films formed from low density ethylene/hexene copolymers having a density of from about 0.916 to about 0.92 may have especially desirable properties as pallet stretch wrap. For example, such stretch wrap may hold loads together and onto pallets and resist breaking when subjected to forces encountered in loading operations where loads are moved about, dropped, etc. A particular example of a slot cast film formed from an ethylene/hexene copolymer having a density of about .92 and a melt index of 1.7 (ASTM D-1238, condition E), which is, in turn, formed in a gas phase, fluid bed reactor with a catalyst according to the present invention, is a slot cast film having a thickness of 1 mil, an MD tensile strength of at least about 5,000 lbs/in$^2$, an ultimate elongation of at least 500 percent and a TD Elmendorf tear strength of at least 600 g/mil.

The following Examples give examples of reactants and parameters which may be used in accordance with aspects of the present invention.

EXAMPLE 1

All procedures were carried out in glass or quartz equipment under purified nitrogen using predried nitrogen purged solvents.

Davison silica gel, Grade 952, was dehydrated by fluidizing with nitrogen, heating at 200° C. for two hours and cooling to room temperature. This heated silica is believed to contain about 2 mmoles of OH groups per gram of silica.

15 g of this product was slurried in 200 ml n-hexane. A 2.0 molar solution of ethylmagnesium chloride in tetrahydrofuran (50 ml, 100 mmoles was added dropwise to the refluxing slurry over approximately 20 minutes, after which time refluxing was continued for a further 30 minutes. The solvents were distilled off, giving 29.5 g of dry free-flowing powder.

15 g of this product (50.8 mmoles of Mg) was slurried in a 0.57 Molar solution of TiCl$_4$ in heptane (150 ml, 85.5 mmoles) and refluxed for 45 minutes, filtered, the solids washed with three 150 ml portions of hexane and dried under vacuum. The titanium content of this solid catalyst was 1.39 mmoles/g.

Slurry Polymerizations in n-Hexane

1. Ethylene, 1-Butene Copolymerization

To 1.0 liter of pure dry n-hexane at 30° C. was added a 1.52 M solution of triethylaluminum (1.90 ml, 2.89 mmoles), 1-butene (50 g, 0.89 moles), hydrogen (0.06 moles) and the above catalyst (0.079 g, 0.11 mmoles Ti) giving an Al/Ti ratio of 26. Ethylene addition was begun and polymerization conditions were adjusted to 80° C. and 120 psig total pressure. After 30 minutes, under these conditions, ethylene addition was stopped and the reactor cooled. Upon vacuum drying, a total of 195 g of polymer with a melt index (MI, I$_2$) of 53 and a density of 0.9166 g/cc was obtained.

2. Ethylene, 1-Hexene Copolymerization

The copolymerization was carried out as in 1 using 2.4 ml (3.65 mmoles) of IEAL, 91 g 1-hexene (1.08 moles), hydrogen (0.033 moles) and 0.079 g (0.11 mmoles Ti), giving an Al/Ti ratio of 33. After drying, a total of 150 g of polymer with a MI of 3.95 and a density of 0.9187 g/cc was obtained.

COMPARATIVE EXAMPLE A

Several catalysts prepared substantially in accordance with the teachings of the Karol et al U.S. Pat. No. 4,302,566 were used in comparative testing as discussed in Examples given hereinafter. These catalysts prepared substantially in accordance with this Karol et al patent are referred to herein as "comparative A" catalysts or simply as "A" catalysts.

The comparative A catalysts are felt to be substantially equivalent to the catalysts prepared according to the Examples of the Karol et al patent. More particularly, these catalysts are felt to be substantially equivalent to those prepared by the following representative procedure.

In a 5 liter flask equipped with a mechanical stirrer, 16.0 g (0.168 Mol) of anhydrous $MgCl_2$ is mixed with 850 ml of pure tetrahydrofuran under nitrogen. The mixture is stirred at room temperature (~25° C.) while 13.05 g (0.069 Mol) of $TiCl_4$ is added dropwise. After complete addition, the contents of the flask are heated to reflux for about one-half to one hour to dissolve the solids. The system is cooled to room temperature and 3 liters of pure n-hexane are slowly added over a period of one-half hour. A yellow solid precipitates. The supernatant is decanted and the solids are washed with 3X one liter of n-hexane. The solids are filtered and dried in a rotating evaporating flask at 40°-60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they are first added to the electron donor compound and that all other residual weight in the precursor composition is due to the electron donor compound.

felt to be representative of the preparation of the catalysts of Examples 3-7 and is described below:

Step A 15 grams of Davison silica gel (dried at 200° C. for 4 hours) were placed into a 500 ml 4-neck reaction flask fitted with a dropping funnel, water condensor, dry nitrogen line, and overhead stirrer. Under a slow nitrogen purge, 200 ml of dry hexane was added to the silica while stirring. The silica/hexane slurry was brought to reflux temperature and 50 ml of 2.0 M EtMgCL/THF solution was added dropwise (about 15 minutes) and the reflux was continued for an additional 30 minutes. After this time, the solvents were removed by distillation and the silica dried at ~80° C. under a nitrogen purge. Total yield, 29 grams; Mg (Theory) 3.45 mmols/gm.

Step B 15 grams of Step A reaction product (51.7 mmols of Mg) were placed into a 500 ml reaction flask (apparatus as described above). 200 ml of n-heptane containing 10.0 ml (91 mmols) of $TiCl_4$ was added to the flask while stirring. The slurry was refluxed for 45 minutes. After this time, the slurry was cooled to room temperature, transferred to a filter flask (under nitrogen), filtered, washed with four 100 ml portions of hexane and dried under nitrogen purge; Mg (found) 1.65 mmols/gm, Mg (Theory) 1.67; Ti (found) 1.24 mmols/gm.

In addition, for comparison reasons, Example 5 was repeated with the molar ratio of $TiCl_4$ added in Step B to the magnesium present on the silica being less than 1. The resultant catalyst and the processing details are indicated in Table I as Example 5 (Comparative).

TABLE I

CONDITIONS USED TO PREPARE CATALYSTS

STEP A

| Example Number | Dehydration Temperature °C. | GMS Silica | (a) mmols SiOH | mmols RMg X | Mg SiOH | Product Wt. (gms) | Mg mmols/gm (Theory) |
|---|---|---|---|---|---|---|---|
| 2 | 200 | 15.0 | 45 | 100 | 2.2 | 29.0 | 3.45 |
| 3 | 200 | 15.0 | 45 | 40 | 0.9 | 19.5 | 2.05 |
| 4 | 200 | 15.0 | 45 | 20 | 0.4 | 16.7 | 1.20 |
| 5 | 600 | 15.0 | 22 | 20 | 0.9 | 17.4 | 1.15 |
| 6 | 800 | 25.0 | 12 | 10 | 0.8 | 26.5 | 0.38 |
| 7 | 800 | 15.0 | 15 | 100 | 6.7 | 32.7 | 3.06 |

STEP B

| Example Number | Dehydration Temperature °C. | GMS Step (A) Product | mmols Mg | mmols Ti | Product Wt. | mmols/GM Mg (found) | Mg (theory) | Ti (found) | Mg/Ti |
|---|---|---|---|---|---|---|---|---|---|
| 2 | 200 | 15.0 | 51.7 | 91.1 | 18.0 | 2.93 | 2.87 | 1.51 | 1.9 |
| 3 | 200 | 15.0 | 30.7 | 91.1 | 18.4 | 1.65 | 1.67 | 1.24 | 1.3 |
| 4 | 200 | 15.0 | 17.9 | 91.1 | 18.2 | 0.81 | 0.99 | 1.19 | 0.69 |
| 5 | 600 | 15.0 | 17.2 | 91.1 | 17.9 | 0.96 | 0.96 | 0.72 | 1.3 |
| 6 | 800 | 15.0 | 5.7 | 45.6 | 16.2 | 0.37 | 0.35 | 0.39 | 0.95 |
| 7 | 800 | 15.0 | 45.9 | 91.1 | 20.3 | 1.98 | 2.26 | 1.59 | 1.2 |

(a) Surface hydroxyl concentration of silica dried at various temperatures were taken from: J. B. Peri and A. L. Hensley, Jr., J. Physical Chem., 72 (8), 2926 (1968)

Analysis of the solid would typically show the following percent by weight: Mg:6.1 percent, Ti:4.9 percent; which corresponds to $TiMg_{2.45}Cl_{8.9}(THF)_{7.0}$. THF means tetrahydrofuran.

This precursor composition, which constitutes the catalytic portion of the comparative A catalyst, is supported on an inert silica carrier and activated in accordance with the teachings of the Karol et al patent.

EXAMPLES 2-7

The catalysts of Examples 2-7 were prepared in two steps and the details are summarized in Table I, hereinbelow. The preparation of the catalyst of Example 2 is Catalysts were initially tested in a 1.6 liter slurry reactor and in a representative experiment, 1.0 liter of hexane and about 100 ml of 1-hexene (62.5 gms) were added to the autoclave while at ambient temperature. 0.047 gms of catalyst (0.06 mmols of Ti) was slurried into about 50 ml of hexane to which was added sufficient triethyl aluminum to give an Al/Ti ratio of 40. This catalyst slurry was transferred to the reactor using slight nitrogen pressure and 0.03 moles of hydrogen were added by measuring through a calibrated Hoke bomb.

The stirring rate was adjusted to 1000 rpm and the temperature control unit set to 80° C. Ethylene pressure was introduced when the autoclave reached 40° C., and the total reactor pressure was adjusted to 115 psi.

Polymerizations were continued for 25–35 minutes in order to produce 130–150 grams of polymer.

About 400 ppm of Irganox 1076 was added to the polymer/hexane slurry and the hexane was allowed to evaporate under a hood. The products were placed into a vacuum oven overnight at approximately 60° C. to remove residual hexane and monomer.

Figure 2:
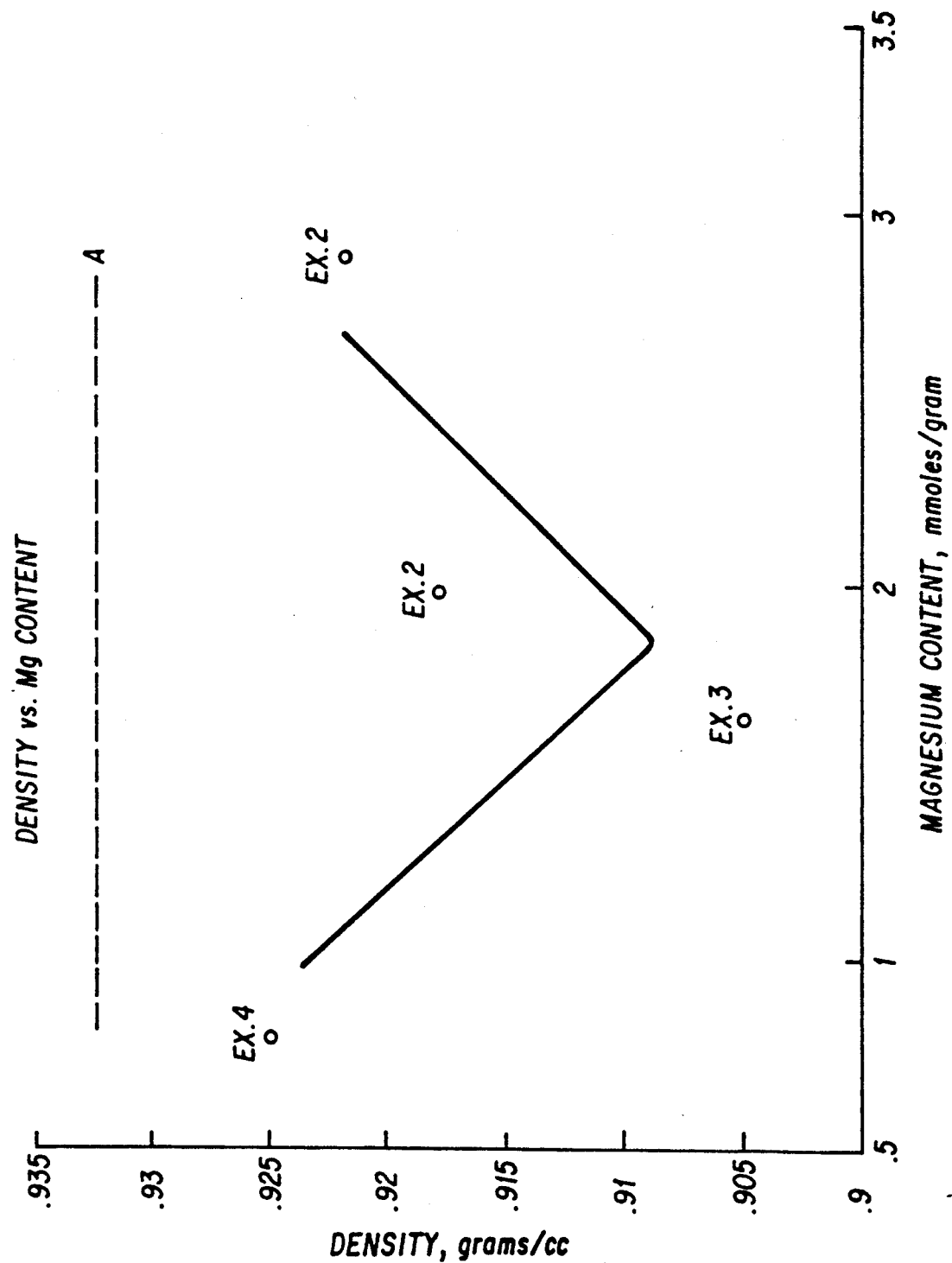
FIG. 2 is a graph showing the variation in the density of LLDPE polymers according to the magnesium content of the polymerization catalyst of the invention.

FIG. 2 shows the change in the copolymerization properties of the catalysts of Examples 2–4, as well as comparative A, as measured by resin density at the 1–3 $I_2$ melt index level over a range of magnesium loadings into Davison 952 silica dried at 200° C.

If silica dried at 800° C. is used in place of silica dried at 200° C., the copolymerization properties of the catalysts may vary. It is noted that silica dried at 200° C. contains about 6 SiOH groups/100 Angstrom$^2$ while silica dried at 800° C. contains only about 1 SiOH group/100 Angstrom$^2$.

Ethylene/1-butene copolymers were prepared under similar conditions with both comparative A catalyst and the Example 2 catalyst. Table II summarizes the polymerization conditions and product properties of $C_2/C_4$ copolymers prepared with A and Example 2 catalysts. Examination of the data in Table II indicates that under similar polymerization conditions the Example 2 catalyst produced a lower density product than the A catalyst.

TABLE II*

POLYMERIZATION CONDITIONS AND PRODUCT DATA FOR $C_2/C_4$ COPOLYMERS PREPARED WITH A AND EXAMPLE 2 CATALYSTS

| Experiment No. | Conditions** | | | Product | | |
|---|---|---|---|---|---|---|
| | Catalyst Type | $H_2/C_4$ | $C_4/C_2$ | Gms Butene | $I_2$ gms/ 10 min. | Density gms/cc |
| 1 | A | 0.13 | 2.1 | 50 | 23 | 0.932 |
| 2 | A | 0.13 | 2.0 | 48 | 9.0 | 0.933 |
| 3 | A | 0.13 | 1.9 | 50 | 10 | 0.929 |
| 4 | Ex. 2 | 0.13 | 2.1 | 50 | 61 | 0.917 |
| 5 | Ex. 2 | 0.13 | 2.1 | 50 | 53 | 0.917 |
| 6 | Ex. 2 | 0.06 | 1.1 | 30 | 1.7 | 0.925 |
| 7 | A | 0.06 | 0.9 | 30 | 2.1 | 0.934 |
| 8 | A | 0.06 | 0.9 | 30 | 1.5 | 0.931 |
| 9 | Ex. 2 | 0.06 | 0.9 | 30 | 1.1 | 0.929 |
| 10 | A | 0.05 | 1.5 | 48 | 2.3 | 0.929 |
| 11 | Ex. 2 | 0.05 | 1.5 | 48 | 1.1 | 0.925 |
| 12 | A | 0.10 | 1.9 | 47 | 2.4 | 0.926 |
| 13 | Ex. 2 | 0.06 | 1.6 | 49 | 1.8 | 0.920 |
| 14 | A | 0.05 | 2.1 | 64 | 1.0 | 0.919 |
| 15 | A | 0.08 | 2.2 | 64 | 2.3 | 0.921 |
| 16 | Ex. 2 | 0.07 | 2.2 | 66 | 1.3 | 0.908 |
| 17 | Ex. 2 | 0.05 | 1.8 | 53 | 3.6 | 0.912 |
| 18 | Ex. 2 | 0.06 | 1.9 | 53 | 4.7 | 0.913 |
| 19 | Ex. 2 | 0.05 | 1.7 | 55 | 2.9 | 0.917 |
| 20 | Ex. 2 | 0.05 | 1.6 | 50 | 2.6 | 0.920 |

*Data illustrated in FIG. 2.
**Other conditions: 80° C., 1.01 Hexane, 1000 rpm, ~0.08 moles of titanium in 1.6 liter reactor.

For example, comparison of experiments 1 and 5 in Table II shows that the A catalyst produced a product with a density of 0.932 gms/cc while the Example 2 catalyst product exhibited a density of 0.917 gms/cc. Both the A and Example 2 catalysts require comparable amounts of hydrogen to produce a product with a melt index of about 1–2 (compare experiments 8 and 9). However, at higher hydrogen levels, the Example 2 catalyst products produces a much higher melt index product than A (compare experiments 4 and 3 in Table II).

Figure 3:
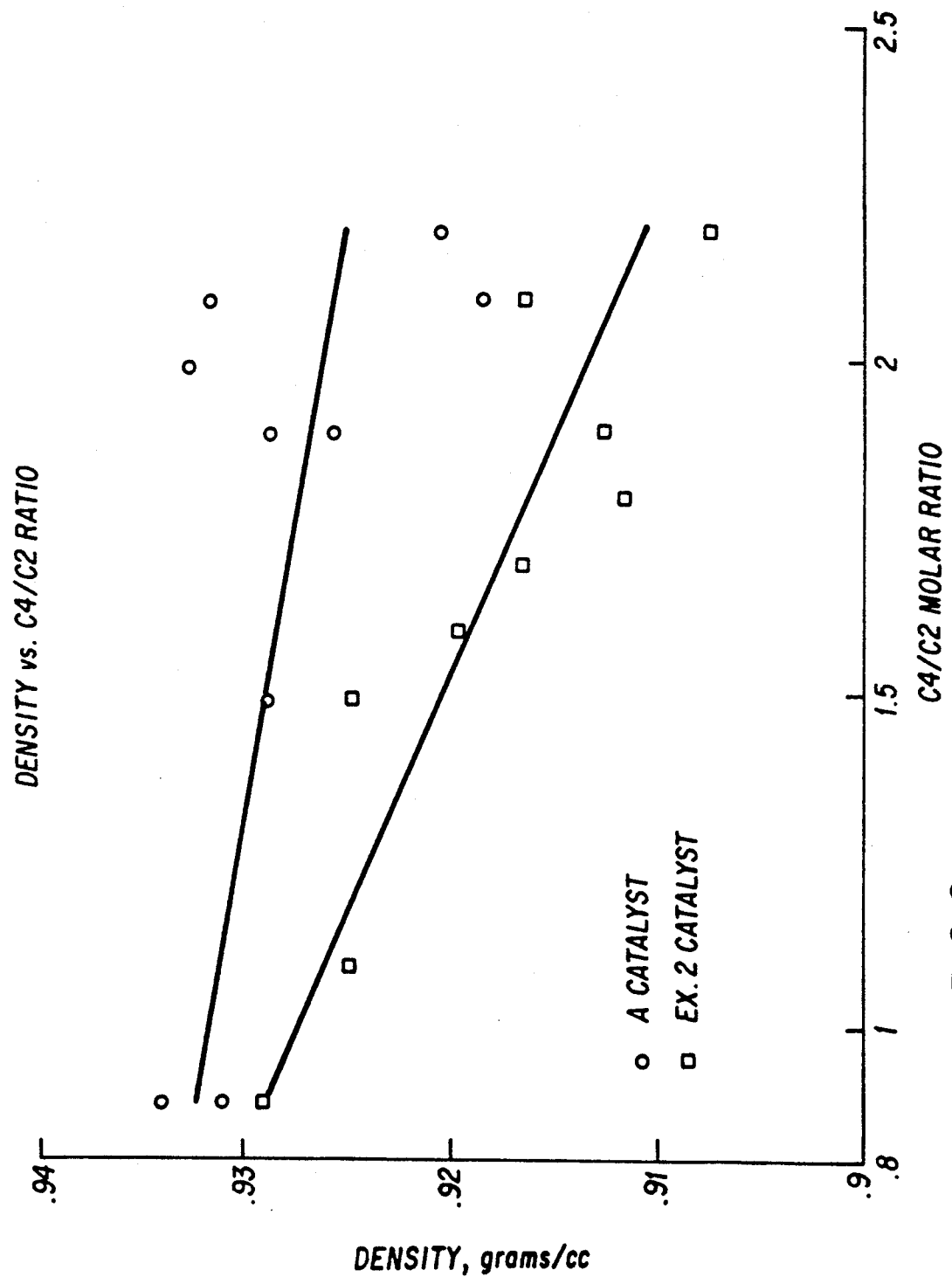
FIG. 3 is a graph showing the variation in density of LLDPE polymers with the ratio of butene to ethylene in the feed using a prior art catalyst and a catalyst according to the invention.

FIG. 3 illustrates the copolymerization differences between the A and Example 2 catalysts. FIG. 3 shows the density versus the butene/ethylene ratio for each of these catalysts.

Examination of FIG. 3 suggests that a 0.918 gm/cc LLDPE product requires a $C_4/C_2$ ratio of about 2.7 for A catalyst while the Example 2 catalyst requires only a ratio of 1.7. This corresponds to 35 percent less butene in the reactor for the Example 2 catalyst.

Figure 4:
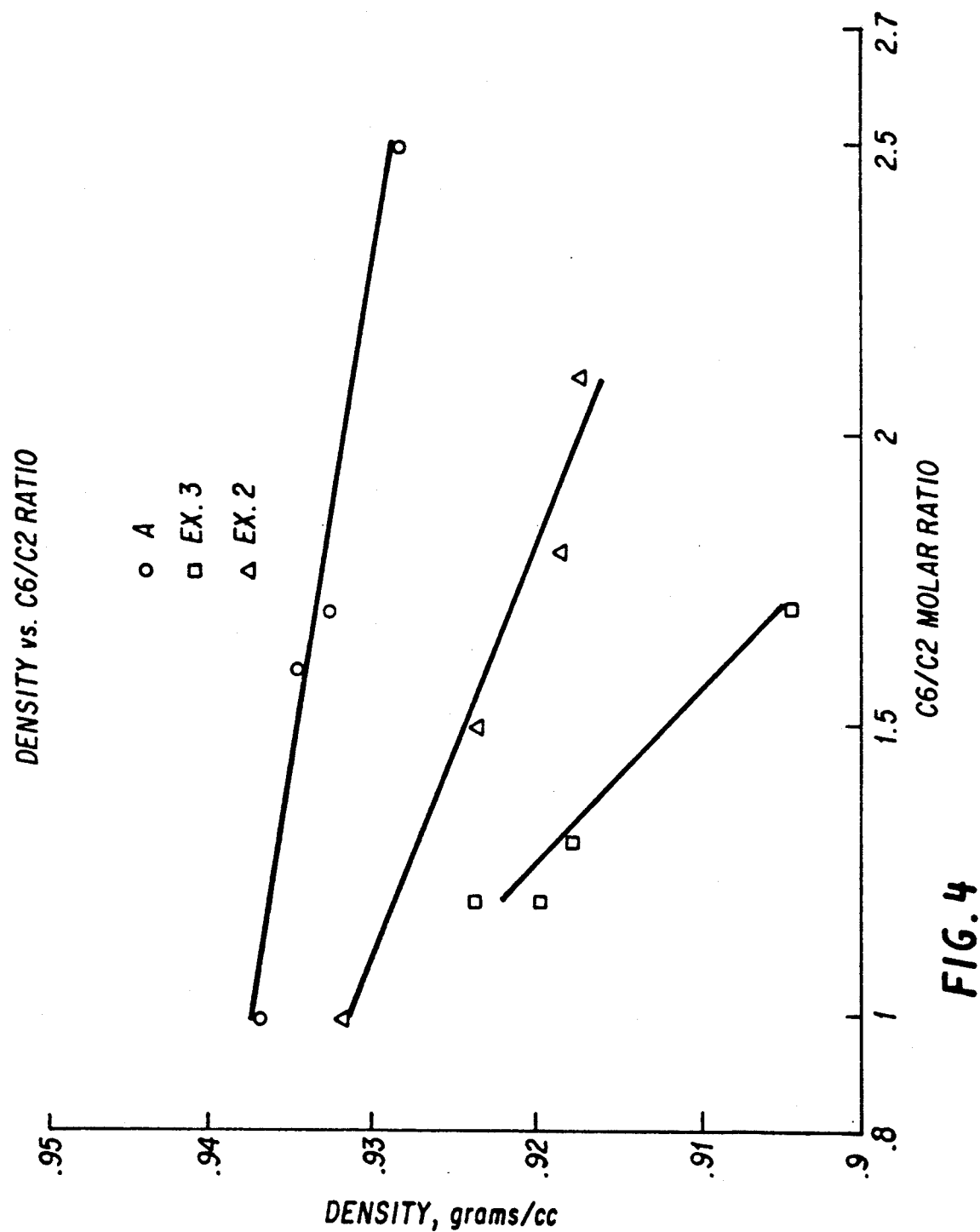

Table III and FIG. 4 summarize the polymerization conditions and product properties of the ethylene/1-hexene copolymers prepared with A, Example 2 and 3 catalysts in a 1.6 liter slurry reactor. The Example 3 catalyst contains less magnesium and exhibits better copolymerization properties than the Example 2 catalyst.

TABLE III*

POLYMERIZATION CONDITIONS AND PRODUCT DATA FOR $C_2/C_6$ COPOLYMERS PREPARED WITH Ex. 3, Ex. 2 and A CATALYSTS

| Experiment No. | Conditions** | | | Product | | |
|---|---|---|---|---|---|---|
| | Catalyst Example | $H_2/C_4$ | $C_6/C_2$ | Gms Butene | $I_2$ gms/ 10 min. | Density gms/cc |
| 21 | A | 0.05 | 1.0 | 49 | 1.2 | 0.937 |
| 22 | 2 | 0.05 | 1.0 | 49 | 2.9 | 0.932 |
| 23 | 3 | 0.05 | 1.2 | 60 | 1.9 | 0.920 |
| 24 | 3 | 0.05 | 1.2 | 57 | 2.4 | 0.924 |
| 25 | 3 | 0.05 | 1.3 | 64 | 2.1 | 0.918 |
| 26 | A | 0.05 | 1.6 | 75 | 1.2 | 0.935 |
| 27 | A | 0.06 | 1.7 | 87 | 1.6 | 0.933 |
| 28 | 2 | 0.05 | 1.5 | 72 | 2.2 | 0.924 |
| 29 | 3 | 0.05 | 1.7 | 86 | 3.6 | <0.905 |
| 30 | 2 | 0.05 | 2.1 | 92 | 1.2 | 0.918 |
| 31 | A | 0.05 | 2.5 | 120 | 1.9 | 0.929 |
| 32 | 3 | 0.06 | 1.8 | 91 | 3.9 | 0.919 |

*Data illustrated in FIG. 4.
**Other conditions: 80° C., 1.01 Hexane, 1000 rpm, ~0.08 mmols of titanium in 1.6 liter reactor total pressure 120 psi.

Examination of FIG. 4 clearly shows that the copolymerization properties of these three catalysts are Example 3 > Example 2 > A. At a 1-hexene to ethylene ratio of about 1.3, the Example 2, Example 3 and A catalysts produced resins with densities of about 0.918 gm/cc, 0.927 gms/cc and 0.935 gms/cc, respectively.

The Example 3 catalyst requires about 50 percent (±10 percent) less 1-hexene in the reactor than A catalyst to produce a LLDPE material with a density of about 0.920 gm/cc.

Catalysts were utilized in a two gallon slurry laboratory reactor so that sufficient quantities of polymer (500–800 gms) could be prepared for evaluation. Table IV and FIG. 5 summarize the polymerization conditions and product properties of ethylene/1-hexene copolymers prepared with catalysts of Examples 3, 5, 6, 7 and A. Examination of FIG. 5 suggests that the relative copolymerization properties of these catalysts are (Example 3, Example 5) > Example 6 > Example 7 > A. However, the differences between Example 3, Example 5 and Example 6 are relatively small (±10 percent) and may not be statistically significant.

TABLE IV

POLYMERIZATION CONDITIONS AND PRODUCT DATA FOR $C_2/C_6$ COPOLYMERS PREPARED IN THE TWO GALLON REACTOR

| Experiment No. | Conditions | | | Product | | |
|---|---|---|---|---|---|---|
| | Catalyst Example | gms Hexene | $C_6/C_2$ | $I_2$ gms/ 10 min. | Density gms/cc | Yield gms |
| 33 | 3 | 270 | 1.05 | 0.9 | 0.928 | 604 |
| 34 | 3 | 310 | 1.25 | 1.0 | 0.925 | 435 |
| 35 | 3 | 440 | 1.84 | 1.2 | 0.918 | 575 |
| 36 | 5 | 316 | 1.34 | — | 0.923 | 485 |

TABLE IV-continued
POLYMERIZATION CONDITIONS AND PRODUCT DATA FOR C$_2$/C$_6$ COPOLYMERS PREPARED IN THE TWO GALLON REACTOR

| Experiment No. | Conditions Catalyst Example | gms Hexene | C$_6$/C$_2$ | Product I$_2$ gms/10 min. | Density gms/cc | Yield gms |
|---|---|---|---|---|---|---|
| 37 | 5 | 382 | 1.66 | 2.0 | 0.920 | 444 |
| 38 | 5 | 380 | 1.56 | — | 0.919 | 460 |
| 39 | 7 | 671 | 28.5 | 1.7 | 0.924 | 668 |
| 40 | 6 | 391 | 1.58 | 0.4 | 0.928 | 330 |
| 41 | 6 | 412 | 1.66 | 0.2 | 0.925 | 500 |
| 42 | 6 | 405 | 1.72 | 0.4 | 0.927 | 409 |
| 43 | 6 | 438 | 1.86 | 0.6 | 0.926 | 460 |
| 44 | A | 410 | 1.68 | 0.6 | 0.935 | 506 |
| 45 | A | 441 | 1.87 | 1.0 | 0.933 | 540 |
| 46 | A | 644 | 2.74 | 0.9 | 0.929 | 655 |
| 47 | A | 1006 | 4.5 | 3.2 | 0.919 | 715 |

The catalyst of Example 2 may generate about four times as much heat (per area of catalyst particle) as the Example 6 catalyst. This extra heat could result in severe temperature gradients within certain fluid bed reactors and poor operability and/or bulk density. Therefore, even in gas phase, fluidized bed arrangements which cannot optimally accommodate relatively high heat generating catalysts, such as the Example 2 catalyst, such fluidizing bed arrangements may readily accommodate relatively low heat generating catalysts, such as the Example 6 catalyst, without encountering problems of severe temperature gradients, poor operability and/or poor bulk density.

The data used for FIG. 2 is summarized in Table V as follows.

TABLE V
DATA USED FOR FIG. 2

| Experiment No. | Catalyst Example | Gms Hexene | C$_6$/C$_2$ | Density | I$_2$ |
|---|---|---|---|---|---|
| 48 | A | 87 | 1.73 | .9328 | 1.65 |
| 49 | A | 76 | 1.60 | .9351 | 1.21 |
| 50 | 2 | 91 | 1.84 | .9187 | 3.95 |
| 51 | 2 | 72 | 1.53 | .9241 | 2.22 |
| 52 | 2 | 87.5 | 1.86 | .9194 | 1.50 |
| 53 | 2 | 84.5 | 1.78 | .9178 | 4.86 |
| 54 | 3 | 86 | 1.68 | <.905 | 3.59 |
| 55 | 3 | 90.5 | 1.92 | <.905 | 7.31 |
| 56 | 4 | 88 | 1.86 | .9247 | 1.04 |
| 57 | 4 | 91 | 1.93 | .9253 | 2.86 |

The performance of scaled up version of the catalyst of Example 6 (essentially the same as the aforementioned version except that the Mg loading in step A is 0.53 mmoles of mg instead of 0.38 mmoles/g) and A catalysts were compared under nearly identical operating conditions in a fluidized-bed, pilot reactor. This comparison was accomplished keeping two important operating variables constant, namely temperature, and the molar ratio of hexene to etnylene in the gas phase, and then observing the physical properties of the resin product under these comparable conditions.

The experiments were done in a pilot-scale fluidized-bed reactor which is 18 inches in diameter and capable of producing up to 50 lb/hr of resin. The catalysts used for the comparison were A and the catalyst of Example 6 which was prepared at a pilot plant. The only difference between the pilot plant preparation of the catalyst of Example 6 and the laboratory procedure (described earlier) was that a solvent decantation followed by several solvent washes was substituted for the filtration in Step B. Details of the comparison are found in Table VI, and support the slurry reactor findings that the catalyst of Example 6 has significantly improved copolymerization properties compared to A when run under similar reactor conditions.

TABLE VI
COMPARISON OF EX. 6 AND A IN A GAS PHASE REACTOR

| | Ex. 6* | | A |
|---|---|---|---|
| | Experiment 1 | Experiment 2 | Experiment 1 |
| Reaction temperature | 85° C. | 85° C. | 85° C. |
| Hexene/ethylene molar ratio in gas phase | .123 | .107 | .11-.12 |
| Hydrogen/ethylene molar ratio in gas phase | .207 | .209 | .21-.22 |
| Physical Properties | | | |
| Melt Index | 1.69 | 1.28 | 1.6 |
| Density | .9201 | .9247 | 0.934 |

*[Mg] = 0.53 mmols/g; [Ti] = 0.50 mmols/g.

The hexene copolymer samples were extruded into film at standard conditions on a Brabender blown film line. The system comprises a ¾ inch extruder feeding a one inch diameter blown film die. The die gap was 0.39 inches. Extrusion rate for all samples was 2.4 lb/hr, at a melt temperature of 185 to 195° C. The film was extruded at a thickness of 1.5 mils, with a 2:1 blowup ratio and a 2 ¼ inch frost line height. All resin samples were stabilized with the same formulation; 700 ppm Kemamine AS 990 to neutralize catalyst residues, 200 ppm Irganox 1010 hindered phenolic antioxidant, and 200 ppm Weston 399 phosphite type peroxide decomposer.

Physical properties were then run on the film in the product development laboratory. The values obtained in the laboratory are not in strict accordance with ASTM testing procedures, since the laboratory temperature and relative humidity are not controlled. The values reported are of merit in an approximate relative sense. Table VII lists the film properties measured on the A and Example 6 catalyzed samples prepared in the fluid bed pilot plant. MD tear strength is a measure of the resistance of the film to the propagation of a tear initiated in the machine direction of the film. TD tear measures the resistance of the film to the propagation of a tear initiated in the transverse direction of the film. Impact strength measures the amount of energy absorbed during a high speed puncture of the film. These tests are felt to be of significant value in the ranking of relative toughness.

TABLE VII
FILM PROPERTIES

| Catalyst Type Used | Head Pressure (psig) | Tear Strength (gm/mil) MD | TD | Impact Strength (gm/mil) |
|---|---|---|---|---|
| A | 2700 | 60 | 230 | 279 |
| A | 2600 | 71 | 222 | 292 |
| Ex. 6 | 2500 | 234 | 586 | 557 |
| Ex. 6 | 2800 | 167 | 564 | 562 |

The improvement in properties of the Example 6 catalyzed hexene copolymers is due essentially to the improved comonomer incorporation, which results in a significantly lower density at the same reactor conditions.

It can easily be seen from the data in Table VII that the Example 6 catalyzed samples (produced at reactor conditions which bracket those of the A catalyzed samples) are much tougher in these tests than the A catalyzed samples. Impact strength of the Example 6 catalyzed samples is nearly double that of the A catalyzed samples. TD tear strength is more than 2.5 times that of the A samples, and MD tear strength averages more than 3 times that of the A samples. The melt indices of these samples were all similar, between 1.3 and 1.7. Head pressure readings indicate that the processability of the A and Example 6 resins are essentially the same.

COMPARATIVE EXAMPLE B

The catalyst of this Comparative Example was prepared in accordance with Example 7 of the Yamaguchi et al U.S. Pat. No. 3,989,881. One will readily note the similarities between this comparative Example B catalyst composition and the catalytically active precursor composition described in the Karol et al U.S. Pat. No. 4,302,566, e.g., exemplified in the passage extending from line 65 of column 14 to line 26 of column 15.

The particular procedure used to prepare the catalyst of comparative Example B is as follows.

15 g (158 mmol) of anhydrous magnesium chloride, $MgCl_2$, was slurried in 530 ml dry tetrahydrofuran (THF) in a one liter 3-necked round-bottomed flask fitted with a magnetic stirrer.

10 g (52.7 mmol) of $TiCl_4$ were added dropwise while heating. The mixture was refluxed for approximately one hour, by which time all solids had dissolved. After cooling, 275 ml hexane were added dropwise at 5 ml/minute to precipitate the solids. The mother-liquors were decanted and the solid washed with two 200 ml portions of hexane by decantation, and dried. The yellow solid contained 3.08 mmol Mg and 0.95 mmol Ti/g catalyst.

EXAMPLES 8-9

All procedures were carried out in glass or quartz equipment under purified nitrogen using predried nitrogen purged solvents.

Davison silica gel, Grade 952, was dehydrated by fluidizing with nitrogen, heating at 800° C. for 16 hours and cooled to room temperature under nitrogen.

A portion of the activated silica, as given in Table VIII, was introduced into a 500 ml 4-necked round-bottomed flask fitted with a stirrer, thermometer, addition funnel, dry nitrogen line and a distillation head to remove solvent. The flask was placed in an oil bath maintained at a controlled temperature.

250 ml hexane was added to the silica while stirring under a slow nitrogen purge. The silica/hexane slurry was brought to reflux temperature and a 2.0 M solution of ethylmagnesium chloride in THF added dropwise over 5-15 minutes. The reflux was continued for an additional 30-40 minutes. After a total of 45 minutes the solvents were removed by distillation and the silica dried at approximately 80° C. under a nitrogen purge. 15 g of this product was slurried in 45.5 mmols of $TiCl_4$ dissolved in 200 ml n-heptane, and the slurry refluxed for 45 minutes, using the same apparatus as described above. The mixture was allowed to cool to room temperature, transferred to a filter flask under $N_2$ and filtered. The solids were washed with three to four 100-150 ml portions of hexane and dried under a nitrogen purge. A free flowing yellow powder was obtained. Analyses for Ti and Mg are given in Table VIII.

COMPARATIVE EXAMPLE C

A catalyst was prepared in substantially the same manner as described for Examples 8 and 9 except that the silica support was omitted. Further details are given in Table VIII. It is noted that the formation of a small amount of precipitate as evidenced by cloudiness was noticed as Grignard was added to hexane. This observation would have been masked if silica were present as a hexane slurry.

EXAMPLES 10-11

Catalysts prepared in the pilot plant were scaled up directly from laboratory preparations, except that decantation had to be used to wash the final catalyst rather than filtration, as described above.

Further preparation details are given in Table VIII.

TABLE VIII

| | DETAILS OF CATALYST PREPARATION | | | | | | |
|---|---|---|---|---|---|---|---|
| Example | SiO$_2$* | MgCl$_2$ | EtMgCl/THF | TiCl$_4$ | Analysis (mmols/g final Cat.) | | |
| Number | (g) | (mmols) | (mmols) | (mmols) | Mg | Ti | Mg/Si—OH*** |
| 8 | 25 | — | 10.0 | 45.5** | 0.37 | 0.39 | 0.77 |
| 9 | 17 | — | 20.0 | 45.5** | 0.92 | 0.81 | 2.26 |
| 10 | 602 | — | 400 | 1821 | 0.53 | 0.50 | 1.28 |
| 11 | 500 | — | 400 | 1593 | 0.75 | 0.54 | 1.54 |
| B | — | 157.4 | — | 52.8 | 3.66 | 0.95 | — |
| C | — | — | 20.0 | 45.5 | — | 1.42 | — |

*SiO$_2$ dried at 800° C. for 16 hours.
**The given amount of TiCl$_4$ was reacted with 15 g of the SiO$_2$/EtMgCl reaction product.
***[Si—OH] of SiO$_2$ = 0.52 mmols/g.

A two gallon autoclave was heated under a pure nitrogen purge to about 90° C. for 0.5 hour to clean out remaining moisture, and then cooled to ambient temperature.

Five liters of prepurified hexane and the desired amount of 1-hexene were added to the reactor and the mixture stirred at approximately 900 rpm. The catalyst was activated in a catalyst addition flask by adding an amount of 25 weight percent triethylaluminum in hexane to a given weight of catalyst suspended in 50 ml of dry hexane. Amounts used are given in Tables IX and X. The mixture was pressured into the reactor using nitrogen and the total reactor pressure adjusted to 20 psig with hydrogen. The reactor was heated at 3° C./minute with a set-point at 80° C. Ethylene was introduced at 60° C. so as to maintain total operating pressure at 120 psig. Polymerizations were carried out for approximately one hour, giving 450-950 g of polymer.

TABLE IX
COMPARISON OF EX. 8 CATALYST WITH B AND C

| Run Identification | | Polymerization Conditions** | | | | | | Product Obtained | | |
|---|---|---|---|---|---|---|---|---|---|---|
| Catalyst Ex. No. | Run No. | Cat. Wt. (g) | H2 (psi) | Total P (psig) | TEAL* (mmol) | Al/Ti ratio | Hexene (g) | Density (g/cc) | I2 (g/10 min) | Yield (g) Run Time (hrs) |
| 8 | 1 | 0.50 | 15 | 120 | 7.6 | 39 | 412 | 0.9250 | 0.2 | 500 (1.0) |
|   | 2 | 0.70 | 25 | 120 | 10.8 | 40 | 550 | 0.9237 | 1.1 | 560 (0.8) |
|   | 3 | 0.73 | 25 | 122 | 11.4 | 40 | 622 | 0.9216 | 1.0 | 537 (0.5) |
| B | 4 | 0.197 | 15 | 105 | 7.1 | 38 | 417 | 0.9322 | 0.12 | 450 (2.0) |
|   | 5 | 0.151 | 20 | 110 | 6.0 | 42 | 644 | 0.9292 | 0.90 | 655 (1.0) |
|   | 6 | 0.168 | 20 | 110 | 6.8 | 42 | 1006 | 0.9188 | 3.2 | 715 (1.0) |
| C | 7 | 0.160 | 25 | 120 | 9.1 | 41 | 449 | 0.9379 | 0.86 | 525 (2.0) |

*25 weight percent triethylaluminum in hexane = 1.54$\underline{M}$.
**Polymerization Temperature: 80° C.

TABLE X
EFFECT OF Mg LOADING ON COPOLYMERIZATION

| Example No. | Mg (mmol/g) | Ratio of Mg to SiOH$^{(d)}$ | Cat. Wt. (g) | H2 (psi) | Total P (psig) | TEAL$^{(b)}$ (mmol) | Al/Ti ratio | Hexene (g) | Density (g/cc) | I2 (g/10 min) | Yield (g) Run (hrs) |
|---|---|---|---|---|---|---|---|---|---|---|---|
| 8 | 0.37 | 0.77 | 0.51 | 15 | 120 | 8.0 | 40 | 438 | 0.9274 | 0.40 | 460 (0.9) |
| 9 | 0.92 | 2.26 | 0.81 | 15 | 120 | 12.3 | 19 | 446 | 0.9162 | 1.73 | 950 (0.6) |
| 10 | 0.53 | 1.28 | 0.80 | 15 | 120 | 12.3 | 31 | 451 | 0.9252 | 0.34 | 821 (1.0) |
| 11 | 0.75 | 1.54 | 0.80 | 15 | 120 | 12.3 | 28 | 451 | 0.9239 | 0.76 | 883 (0.6) |
| B | 3.08$^{(c)}$ | — | 0.197 | 15 | 105 | 7.1 | 38 | 4.17 | 0.9322 | 0.12 | 450 (2.0) |

$^{(a)}$80° C.; 5.0 liters hexane.
$^{(b)}$25 wt. percent triethylaluminum in hexane = 1.54$\underline{M}$.
$^{(c)}$Unsupported.
$^{(d)}$Surface hydroxyl concentration of silica dried at 800° C. taken as 0.52 mmols/g. See J. B. Peri and A. L. Hensley, Jr., J. Phys. Chem., 72 (8), 2926 (1968)

The catalyst of Example 10 was used in a pilot plant, gas phase, fluid bed reactor operating at 85° C. to copolymerize hexene/ethylene at a H2/C2 mole ratio of 0.212 and c6/C2 mole ratio of 0.126.

Activation of the catalyst was carried out in the fluid bed reactor using a 5 weight percent solution of triethylaluminum in isopentane sufficient to give and Al/Ti molar ratio in the reactor of 20-50 and the polymerization was allowed to reach equilibrium under continuous operation. The product obtained had a density of 0.920 g/cc and a melt index I2=1.69 g/10 mins.

As used herein, the term "magnesium" will be understood to connote, especially, chemically combined forms of magnesium as opposed to merely uncombined, elemental forms thereof.

The disclosures of each of the referenced publications, including U.S. Patents, identified hereinabove, are incorporated into this specification by reference.

The present invention may comprise, consist essentially of or consist of the elements or method steps referred to herein.

What is claimed is:

1. A process for preparing a linear low density ethylene/alpha-olefin copolymer having a density of 0.94 g/cc or less comprising conducting the polymerization in the presence of a catalyst prepared by a process consisting essentially of the steps of:

(i) contacting a solid, porous carrier having reactive OH groups with a liquid, said liquid containing at least one organomagnesium composition having the empirical formula

$$R_nMgR'_{(2-n)} \quad (I)$$

where R is a C1–C12 hydrocarbyl group, R' is a halogen, and n is 1, the number of moles of said organomagnesium composition being in excess of the number of moles of said OH groups on said carrier, whereby said organomagnesium composition is reacted with said OH groups on said carrier;

(ii) evaporating said liquid from step (i) to obtain a carrier, containing magnesium, in the form of a dry, free-flowing powder;

(iii) reacting said powder of step (ii) with at least one transition metal compound in a liquid medium, the number of moles of said transition metal compound being in excess of the number of said OH groups on said carrier prior to the reaction of said carrier with said organomagnesium composition in step (i), said transition metal compound being soluble in said liquid medium, and the magnesium being substantially insoluble in said liquid medium, whereby a reacted form of transition metal which is insoluble in said liquid medium becomes supported on said carrier; and (iv) combining the product of step (iii) with a metal alkyl activator.

2. A process of claim 1 wherein said alpha-olefin is at least one C3–C10 alpha-olefin.

3. A process of claim 2 wherein said solid, porous carrier is contacted with said liquid in step (i) in the absence of ball milling.

4. A process of claim 3, wherein said linear low density copolymer is selected from the group consisting of ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

5. A process of claim 4, wherein said linear low density copolymer is an ethylene/hexene-1 copolymer having a density of less than 0.930 g/cc, said copolymer being prepared in a gas phase, fluid bed reactor.

6. A process of claim 5, wherein R is unsubstituted C1–C12 alkyl and R' is Cl, Br or I.

7. A process of claim 6, wherein said contacting step (i) comprises:

(a) slurrying said carrier in a non-Lewis base liquid; and (b) adding said organomagnesium composition to said slurry of step (a) in the form of an ether solution of said organomagnesium composition.

8. A process of claim 7, wherein said solid, porous carrier is substantially composed of silica, alumina or combinations thereof.

9. A process of claim 8 wherein said solid porous carrier is silica having from about 0.3 to about 0.7 mmoles/gram of said OH groups.

10. A process of claim 9 wherein, in step (i), the ratio of the number of moles of said organomagnesium composition to the number of moles of said OH groups on said silica is from about 1.1 to about 2.5.

11. A process of claim 10 wherein, in step (i), the ratio of the number of moles of said organomagnesium composition to the number of moles of said OH groups on said silica is from about 1.5 to about 2.5.

12. A process of claim 11, wherein, in step (i), the ratio of the number of moles of said organomagnesium composition to the number of moles of OH said groups on said silica is from about 2.0 to about 2.5.

13. A process of claim 12 wherein said transition metal compound is a tetravalent titanium compound.

14. A process of claim 13, wherein chemically and physically bound water has been removed from said silica in step (i) by heating at a temperature from about 750° C. to about 850° C. for at least four hours, the organomagnesium composition of formula (II) is $C_2H_5MgCl$, said tetravalent titanium compound is $TiCl_4$ and said liquid medium in step (iii) contains from about 3 to about 6 moles of $TiCl_4$ per moles of magnesium supported on said silica.

15. A process of claim 14, wherein said ethylene/1-hexene copolymer has a density of from about 0.920 to about 0.927, a melt index of about 1 and is capable of being formed into a blown film having a thickness of 1 mil, a dart impact strength of at least 122 g, an MD Elmendorf tear strength of at least 164 g/mil, a TD Elmendorf tear strength of at least 665 g/mil, an MD tensile strength of at least 6,400 lbs/in$^2$ and a TD tensile strength of at least 5,400 lbs/in$^2$.

16. A process of claim 14, wherein said ethylene/1-hexene copolymer has a density of from about 0.916 to about 0.920 and is capable of being formed into a pallet stretch wrap.

17. A process of claim 16, wherein said copolymer has a melt index of 1.7 and is capable of being formed into a pallet stretch wrap which is a slot cast film having a thickness of 1 mil, an MD tensile strength of at least about 5,000 lbs/in$^2$, an ultimate elongation of at least 500 percent and a TD Elmendorf tear strength of at least 600 g/mil.

18. In a process for preparing a linear low density polyethylene polymer, which is a copolymer of ethylene with one or more $C_3$-$C_{10}$ alpha-olefins, said copolymer containing at least about 80 percent by weight of ethylene units, said copolymer having a density of 0.94 g/cc or less, comprising conducting the polymerization in the presence of a catalyst prepared by a process comprising the steps of:
(i) contacting a carrier with a liquid, said liquid containing an organomagnesium composition having the empirical formula R Mg R' where R is $C_2H_5$ and R' is Cl;
(ii) separating said liquid from the product of step (i); and
(iii) reacting said product with $TiCl_4$ in a liquid medium; and
(iv) combining the product of step (iii) with a metal alkyl activator; an improvement comprising: in step (i) using, as said carrier, a silica having reactive OH groups and reacting said silica in step (i), in the absence of ball milling, with about 3.30 moles of said organomagnesium composition per mole of said reactive OH groups;
and in step (ii) separating said liquid by evaporation whereby a supported magnesium composition in the form of a dry, free-flowing powder is formed.

19. A process of claim 18 wherein said linear low density polyethylene polymer is selected from the group consisting of ethylene/1-butene copolymers, ethylene/1-hexene copolymers, ethylene/1-butene/1-hexene terpolymers, ethylene/propylene/1-hexene terpolymers and ethylene/propylene/1-butene terpolymers.

20. A process of claim 19 wherein said linear low density polyethylene polymer is an ethylene/hexene-1 copolymer having a density of less than 0.930 g/cc, said copolymer being prepared in a gas phase, fluid bed reactor.

21. In a process for preparing a linear low density polyethylene polymer which is a copolymer of ethylene with one or more $C_3$-$C_{10}$ alpha-olefins, said copolymer containing at least about 80 percent by weight of ethylene units, said copolymer having a density of 0.94 g/cc or less, comprising conducting the polymerization in the presence of a catalyst prepared by a process comprising the steps of:
(i) contacting a carrier with a liquid, said liquid containing an organomagnesium composition having the empirical formula R Mg R' where R is $C_2H_5$ and R' is Cl;
(ii) separating said liquid from the product of step (i); and
(iii) reacting said product with $TiCl_4$ in a liquid medium; and
(iv) combining the product of step (iii) with a metal alkyl activator; an improvement comprising: in step (i) using, as said carrier, a silica having reactive OH groups and reacting said silica in step (i), in the absence of ball milling, with about 3.30 moles of said organomagnesium composition per mole of said reactive OH groups; and in step (ii) separating said liquid by evaporation to precipitate magnesium onto said silica, said precipitated magnesium being selected from the group consisting of magnesium dichloride, unreacted organomagnesium and mixtures thereof, whereby a supported magnesium composition in the form of a dry, free-flowing powder is formed.

22. A process of claim 21 wherein said linear low density polyethylene polymer is selected from the group consisting of ethylene/1-butene copolymers, ethylene/1-hexene copolymers, ethylene/1-butene/1-hexene terpolymers, ethylene/propylene/1-hexene terpolymers and ethylene/propylene/1-butene terpolymers.

23. A process of claim 22 wherein said linear low density polyethylene polymer is an ethylene/hexene-1 copolymer having a density of less than 0.930 g/cc, said copolymer being prepared in a gas phase, fluid bed reactor.

24. A process of claim 23 wherein said step (i) comprises:
 (a) slurrying said silica in a non-Lewis base liquid; and
 (b) adding said organomagnesium composition to said slurry of step (a) in the form of an ether solution of said organomagnesium composition.

25. A process of claim 24 wherein said silica is dehydrated silica which has been dehydrated by fluidizing with nitrogen, heating at 200° C. for two hours and cooling to room temperature.

26. A process of claim 25 wherein said step (i) and said step (ii) comprise the steps of:
 (a) adding a solution of ethylmagnesium chloride in tetrahydrofuran in a continuous dropwise fashion to a refluxing slurry of said silica in n-hexane, said n-hexane being present in an amount of approximately 13.3 ml per gram of said silica, the concentration of said ethylmagnesium chloride/tetrahydrofuran solution being approximately 2.0 Molar, a total of about 0.25 mls of said ethylmagnesium chloride/ tetrahydrofuran solution being added per ml of hexane over a total time period of about 20 minutes;
 (b) continuing to reflux the slurry of step (a) for a period of about 30 minutes after the completion of said addition step (a); and
 (c) evaporating liquid from the slurry of said step (b) to obtain a dry, free-flowing powder containing tetrahydrofuran complexed with supported magnesium.

27. A process of claim 26 wherein said step (iii) comprises the steps of:
 (a) slurrying dry, free-flowing powder obtained from said step (ii) in a solution of $TiCl_4$ in heptane, approximately one gram of said powder being present per approximately 10 ml of said solution, and the concentration of $TiCl_4$ in said solution being approximately 0.57 Molar;
 (b) refluxing the slurry of said step (a) for about 45 minutes;
 (c) filtering the solids from said step (b);
 (d) washing the filtered solids from said step (c) with three portions of hexane, each portion having about 10 ml per gram of said dry, free-flowing powder initially present in said step (a); and
 (e) drying the solids from said step (d) under vacuum.

* * * * *